INVENTOR
PETER LEVESKI
BY
Samuel J. Stoll
ATTORNEY.

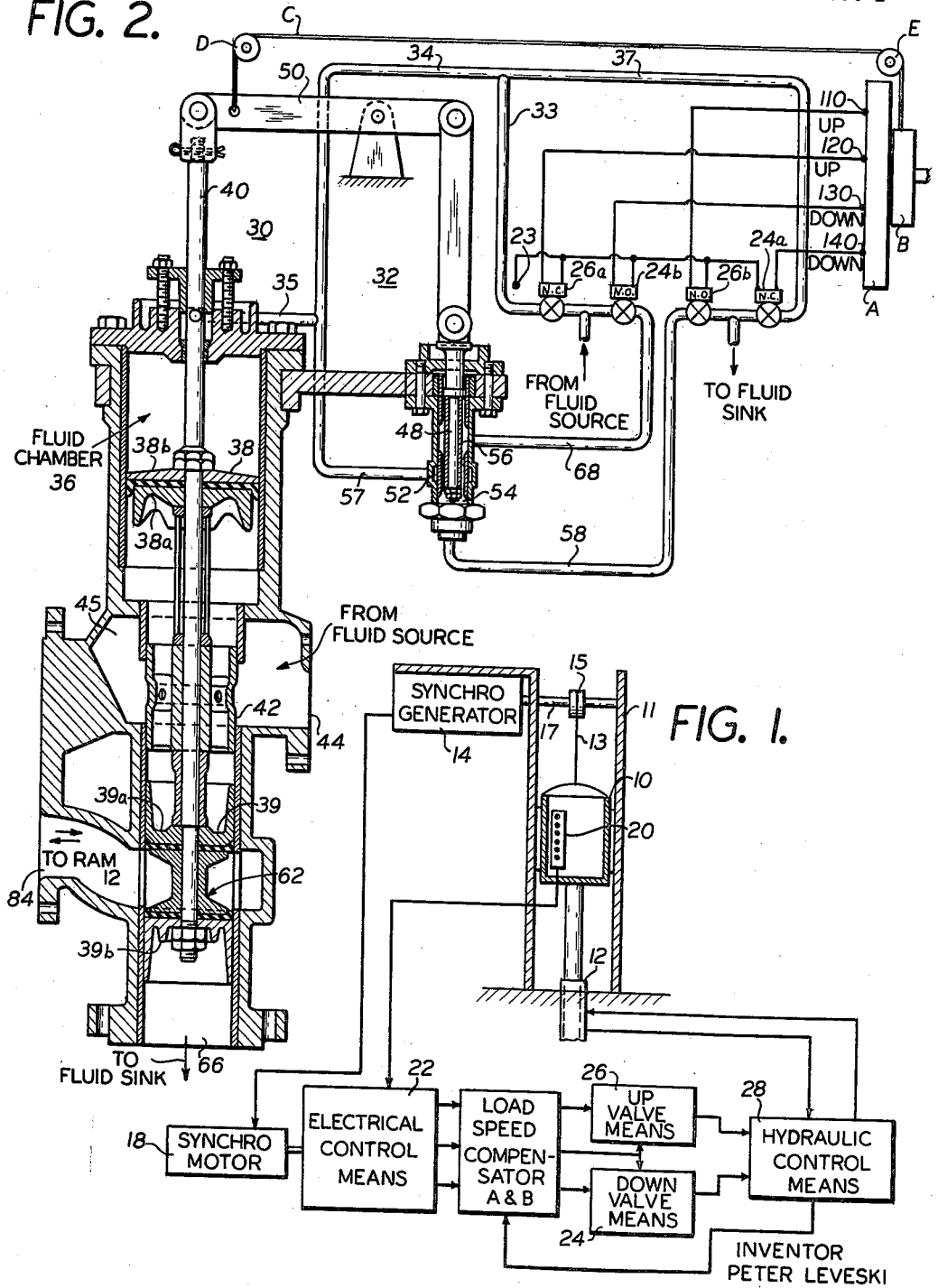

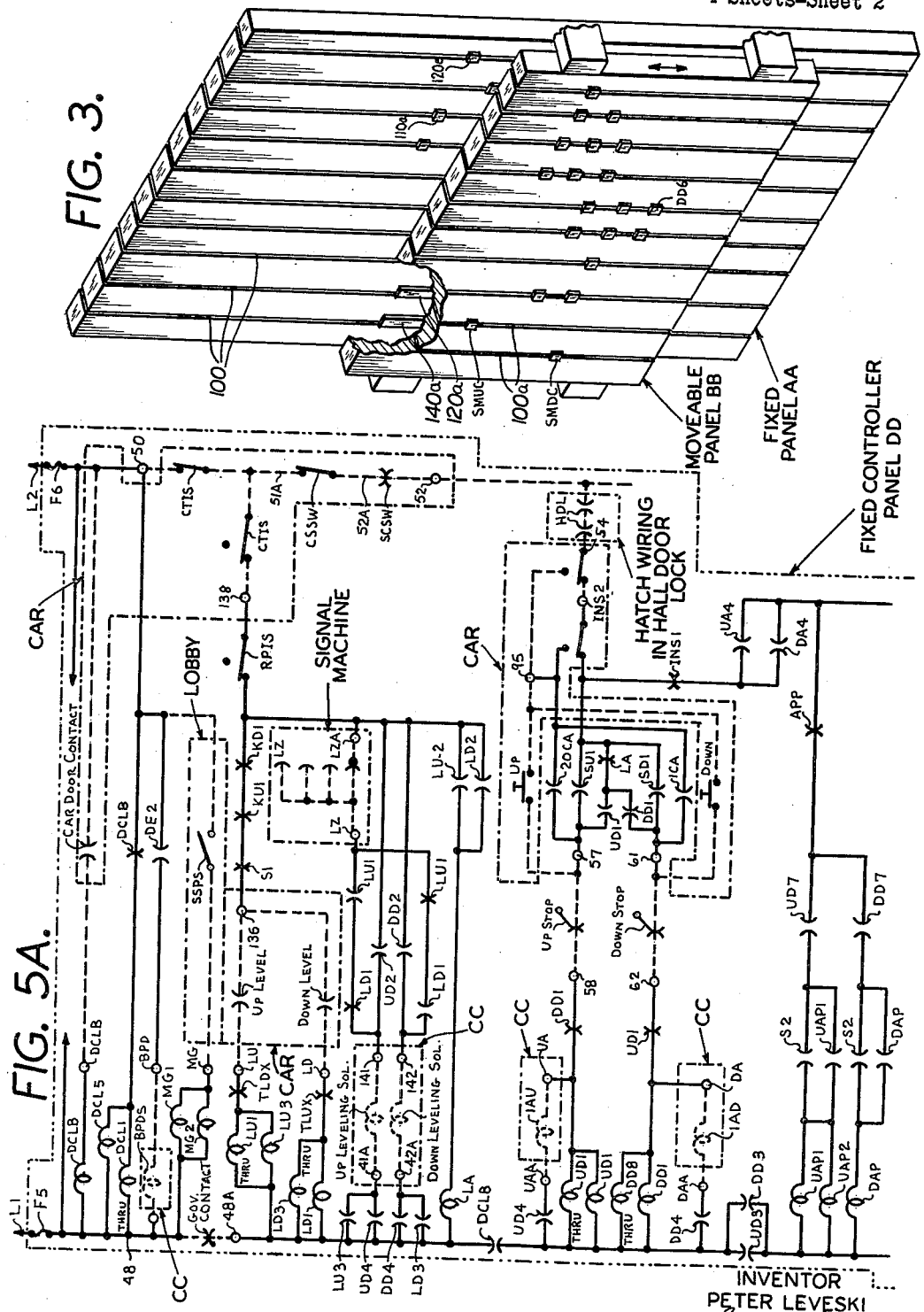

United States Patent Office 3,105,573
Patented Oct. 1, 1963

3,105,573
CONTROL SYSTEM FOR AUTOMATIC HYDRAULIC ELEVATORS
Peter Leveski, 73 Heyward St., Brentwood, N.Y.
Filed Oct. 4, 1960, Ser. No. 60,393
5 Claims. (Cl. 187—29)

This invention relates to a control system for automatic hydraulic elevators and the like. It relates to and constitutes an improvement over such automatic control systems as are illustrated in Patent No. 2,913,070 issued to Magnus N. Nyberg on November 17, 1959.

The essential problem which the prior control systems do not even attempt to solve, as evidenced by the Nyberg patent supra, is that of compensating for variations in load and consequent variations in acceleration, deceleration and velocity. For example, an elevator operating with the automatic controls set forth in said Nyberg patent would travel upwardly at velocities inversely proportional to the load and the same elevator would travel downwardly at velocities directly proportional to the load. It is, of course, desired that velocities be constant irrespective of the size of the load but in the case illustrated a heavier load would result in a slower upward velocity and a faster downward velocity whereas a lighter load would result in a faster upward velocity and a slower downward velocity.

What is said here of velocity applies also to acceleration and deceleration. Thus, a slower acceleration in upward direction and a faster acceleration in downward direction would occur in the presence of a relatively heavy load. Conversely, a faster acceleration in upward direction and a slower acceleration in downward direction would occur in the presence of a relatively light load. Similarly, variations in load would affected deceleration. Thus, a heavier load would hasten deceleration as the car moves in upward direction but deceleration would be retarded in downward direction. By the same token, a relatively light load would result in a slower deceleration in upward direction and faster deceleration in downward direction.

It is the principal object of this invention to provide automatic means for compensating for load variations and thereby automatically adjusting acceleration, deceleration and velocity.

Since the invention relates mainly to hydraulic elevator systems and particularly to water hydraulic systems, it will be understood that variations in acceleration, deceleration and velocity may be achieved by adjusting the operation of the main hydraulic valve. Thus, when acceleration and velocity in upward direction are retarded by a relatively heavy load, it is possible to compensate for such load and to achieve faster acceleration and velocity by the inlet opening in the main valve through which it communicates with the pressure fluid source. In other words, the inlet port of said valve is opened to the extent necessary to admit such volume of hydraulic fluid as will overcome the excessive load and will produce faster acceleration and a higher velocity. To compensate for a relatively light load and consequent slower acceleration velocity in downward direction, what need be done is to enlarge the outlet opening of the main hydraulic valve through which the hydraulic fluid passes to the fluid sink. Again, all this means is to open the outlet port to the extent necessary to compensate for the lighter load and to achieve the fastener acceleration and higher velocity in downward direction which a normal load would conventionally achieve.

The present invention attains these goals by means of a control device consisting of a fixed panel and a movable panel, adjustably mounted contact elements on each of the two panels adapted to engage each other at predetermined points or times upon movement of the movable panel relative to the fixed panel, and means linking the movable panel to the main hydraulic valve stem. As the valve stem rises, the movable panel will fall and, conversely, as the valve stem moves downwardly, the movable panel will move upwardly. This is the preferred arrangement although it is obvious that the linkage arrangement may be reversed so that upward movement of the valve stem will result in corresponding upward movement of the movable panel and downward movement of the valve stem will result in downward movement of said panel. This is purely a matter or arrangement and does not bear on the principles of the invention. As the movable panel moves either upwardly or downwardly relative to the fixed panel, the contact members on the movable panel will engage selected contact members on the fixed panel in accordance with a prearranged setting of the respective contact members. Illustrative of how this system would work is the following:

Assuming a normal load and upward movement of the elevator car at a normal velocity, the valve stem will occupy a given position. Should the valve stem occupy the same position and, should this result in a lower velocity in upward direction by reason of an increased load in the elevator car, this would be signalled to, and sensed by, the control means last above described. In other words, there would be a conflict between the normal position of the valve stem and the subnormal velocity of the elevator car. Selected contact elements on the respective movable and fixed panels would engage each other and an appropriate circuit would be closed to a solenoid-actuated valve connected to a pilot valve which controls the movement of the main valve stem. Said valve stem would accordingly be moved in such direction as would result in further opening the inlet port on the main valve and thereby admit a greater volume of hydraulic fluid into the hydraulic system. This would compensate for the abnormal load in the elevator car and would result in accelerating its upward movement until it attains a normal velocity. Similarly, should the main valve stem occupy a normal position for normal velocity in downward direction and, should the actual velocity exceed the normal velocity by reason of an increased load in the elevator car, this discrepancy between the normal valve stem position and the abnormal downward velocity of the elevator car would be sensed by the control means and contact would be made between those contact elements on the fixed and movable panels which would actuate another solenoid valve. The latter valve would actuate the pilot valve and that in turn would actuate the main valve stem, moving it in such direction and to such extent as would cause the outlet port of the main valve to close to the extent necessary to reduce the downward velocity of the elevator car to normal.

In short, what is herein provided is a control means which is actuated by the main valve stem or by a linkage connected thereto and which is sensitive to the operation of the elevator car. If there is any discrepancy or conflict between the position of the main valve stem and the operation of the elevator car appropriate circuits would be closed through said control means to cancel or neutralize, or compensate for, such discrepancy or conflict. Since the contact members on the fixed and movable panels which comprise said control means are individually adjustable relative to each other, it is possible by predetermining the setting of said contact members to arrange for such compensation for abnormal or subnormal loads, acceleration, deceleration and velocity as will enable the elevator to perform at normal velocities and acceleration and deceleration in either direction irrespective of variations in load.

In essence, what the present invention provides is an adjustable circuit selector. The means for selecting the appropriate circuit is the movable panel above mentioned. Appropriate circuits are closed or opened depending upon the extent of movement of the movable panel relative to the fixed panel and further determined by the relative positions of the contact members on the two panels. The extent of movement of the movable panel is at all times keyed to and determined by the operation of the main valve as manifested by the movement of the main valve stem or linkage connected thereto.

The invention is illustrated in the accompanying drawing, in which:

FIGURE 1 is a schematic view, including block diagram, of an automatic hydraulic elevator system incorporating the control means of the present invention.

FIGURE 2 shows the main and pilot valves in detailed vertical section and the load compensating control means herein claimed in schematic view, together with other elements of the control system, including circuits, hydraulic lines and solenoid controlled valves.

FIGURE 3 is a view of the load compensating control means showing its fixed and movable panels and the adjustable contact members thereon.

FIGURE 5A is a portion of the circuit diagram of the entire control system.

Figure 4A:
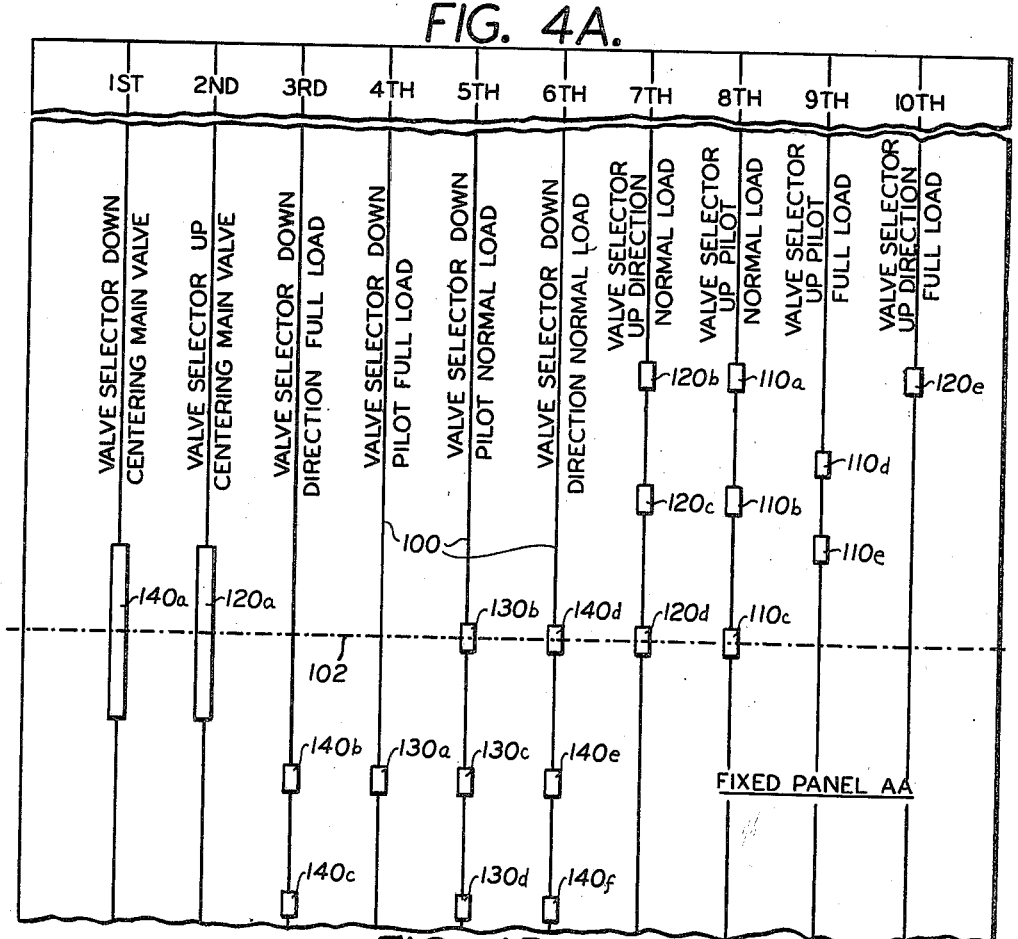
FIGURE 4A is a schematic view of the fixed panel showing its contact members adjustably mounted thereon.

Referring now to the details of the invention as illustrated in the drawing, it will be observed that a conventional elevator car 10 operates within a shaft or hatchway 11 by means of hydraulic pressure. More specifically, a hydraulic ram 12 is connected to the bottom of said elevator car and a cable 13 is connected to the top of said car. Said cable is wound around a counterweight pulley 15 mounted on shaft 17 and it will be noted that said shafe drives a synchro-generator 14 which is electrically coupled to synchro-motor 18 to signal the vertical movements and elevation of the elevator car. When an occupant of the elevator car wishes to proceed either upwardly or downwardly, he presses the appropriate push-button on floor selector panel 20 and a signal characteristic of the selected floor is thereby generated. At the same time synchro-motor 18 in response to signals received from the synchro-generator 14 transmits a signal indicating the actual level of the elevator car. The two signals, namely the one indicating the actual position of the car and the other indicating the desired position thereof, are compared in the electrical control means 22 which functions in conventional manner. If the selected floor is below the position of the elevator car at the time the signal button is pressed, the down valve means 24 is energized causing the hydraulic control means 28 to permit hydraulic fluid to escape from the hydraulic ram 12. This permits downward movement of the elevator car and when the elevator car reaches the selected floor the electrical control means 22 de-energizes the down valve means 24 and further escape of hydraulic fluid is prevented. This stops the hydraulic ram and the car. If the selected floor is above the actual level of the elevator car, the electrical control means 22 energizes the up valve means 26. This causes the hydraulic control means 28 to feed hydraulic fluid under pressure to the hydraulic ram 12 thereby causing upward movement of said ram and the elevator car. Such upward movement continues until the selected floor is reached, at which time up valve means 26 is de-energized and the feeding of hydraulic fluid to the hydraulic ram ceases. The result is that the hydraulic ram and the car are thereby caused to stop.

It will be understood that the down valve means 24, as shown in FIGURE 1, includes the normally closed valve 24a and the normally open valve 24b shown in FIGURE 2. Both of these valves are solenoid-operated. Similarly, the up valve means 26 shown in FIGURE 1 includes normally closed valve 26a and normally open valve 26b, these valves being also solenoid-operated. The hydraulic control means 28 shown in FIGURE 1 includes the main valve 30 and the pilot or control valve 32, these two valves being shown in detail section in FIGURE 2. As shown therein, said valves are in their respective neutral positions. When the elevator car is to move downwardly, as when an appropriate push-button is pressed on floor selector panel 20 within the car or when a corresponding hall push-button is pressed on one of the lower floors, a signal on line 130 energizes the solenoids of valve 24a and 24b, opening valve 24a and closing valve 24b. The fluid sink is thereby coupled through valve 24a and pipes 37, 34 and 35 to the fluid chamber 36 of the main valve 30. Since the effective area of piston 38 in said main valve is greater than the effective area of piston 39 therein the valve stem 40 is driven upwardly. The reason for this will shortly become apparent but it may now be indicated that under the conditions last above described the facing sides 38a and 39a of these two pistons communicate with, and are exposed, to, the pressure fluid source while the outer or opposite outwardly directed sides 38b and 39b of said pistons communicate with the fluid sink. The pressure therefore is on the facing sides 38a and 39a of said pistons and since the effective surface of sides 38a exceeds that of side 39a the result will be an upward movement of the two pistons together with valve stem 40 to which the two pistons are affixed.

Piston 39 is a composite or compound piston consisting of an upper cup above designated side 39a and a lower cup above designated side 39b and an intermediate valve member 62. When the valve stem moves upwardly as above described, valve member 62 and lower cup 39b of piston 39 will similarly move upwardly and thereby provide communication between portions 84 and 66 of the main valve. Port 84 communicates with ram 12 while port 66 communicates with the fluid sink. This would permit hydraulic fluid to escape from the ram to the fluid sink and permit downward movement of the elevator car.

It will now be noted that pivoted linkage 50 is connected at one end to the upper end of the main valve stem 40 and at its opposite end to the upper end of pilot valve stem 48. By reason of this mechanical linkage the two valve stems are caused to move in opposite directions so that upward movement of one of said valve stems is translated into downward movement of the other and vice versa. As the main valve stem 40 raises as above described, pilot valve stem 48 will descend and communication will thereby be effected between pilot valve ports 52 and 56. Since the normally open solenoid-operated valve 24b is now closed, as above set forth, there will be no movement of fluid through pipe 68 which communicates with port 56 and communication between ports 52 and 56 will have no effect on the valve system. When the elevator car reaches the desired floor the signal on line 130 will terminate and solenoid-operated valve 24a will now close since it is a normally closed valve. Similarly, solenoid valve 24b will open since it is a normally open valve. This will enable hydraulic fluid to pass from the hydraulic fluid source through valve 24b, pipe 69, ports 56 and 52, and pipes 57 and 35 to the fluid chamber 36. Pressure will now be exerted upon the upper side 38b of piston 38 and the main valve stem 40 will be caused to move downwardly. By reason of the mechanical linkage above described, valve stem 48 will now rise and communication between ports 52 and 56 will thereby be cut off. At this point the main pilot valves 30 and 32 will have returned to their normal positions of rest and hydraulic ram 12 will stop.

When it is desired to move the elevator car upwardly, a signal on line 120 will energize and open normally closed solenoid valve 26a and energize and close normally open solenoid valve 26b. Hydraulic fluid will now be fed to the fluid chamber 36 from the fluid source through now open valve 26a and pipes 33, 34 and 35. Pressure will thereby be applied to the upper face 38b of piston 38 and the main valve stem 40 will move downwardly. Valve member 62 will of course move downwardly with the main valve stem as will cup 39a of piston 39. Port 84 will now be brought into communication with port 44 through inner fluid chamber 45 and hydraulic fluid under pressure will of course enter and drive the ram 12. This will cause the elevator car to ascend.

At the same time the pilot valve stem 48 will move upwardly by reason of the pivoted mechanical linkage 50 above mentioned. This will result in providing communication between ports 52 and 54 in said pilot valve. Since the normally open valve 26b is now closed, this will have no effect on the hydraulic system. However, when the desired floor is reached, the signal on line 120 will terminate and valves 26a and 26b are de-energized, valve 26a closing and valve 26b opening. Fluid from chamber 36 in the main valve will now pass through pipes 35 and 57, ports 52 and 54 and pipe 58 through the now open valve 26b to the fluid sink. Main valve stem 40 is driven upwardly and pilot valve stem 48 is moved downwardly and such movement continues until communication between ports 52 and 54 is cut off. At this point the hydraulic ram stops since there is no longer any connection between ports 44 and 84 of the main valve 30 and consequently no communication between the ram and the hydraulic fluid source.

Figure 4B:
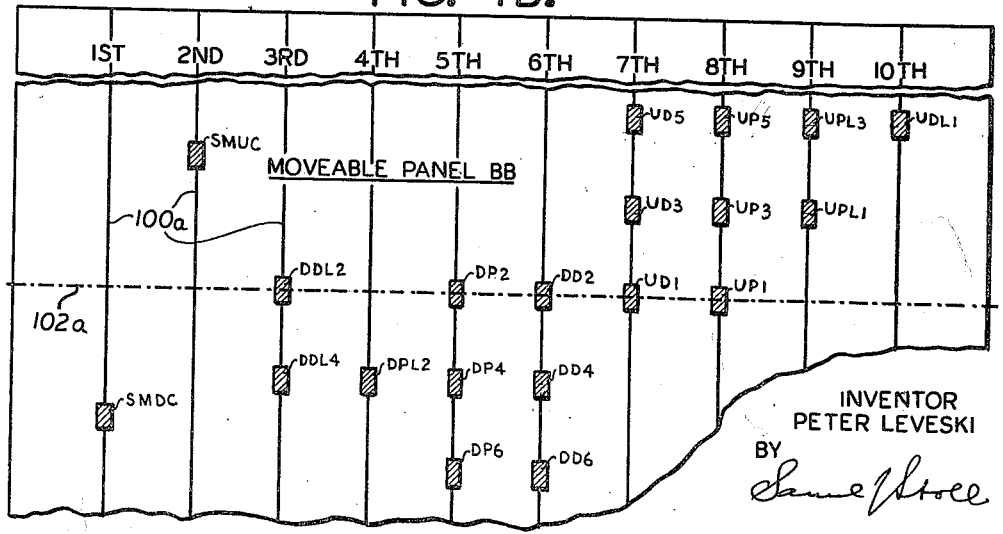
FIGURE 4B is a schematic view of the movable panel with its contact member adjustably mounted thereon.
Figure 5B:
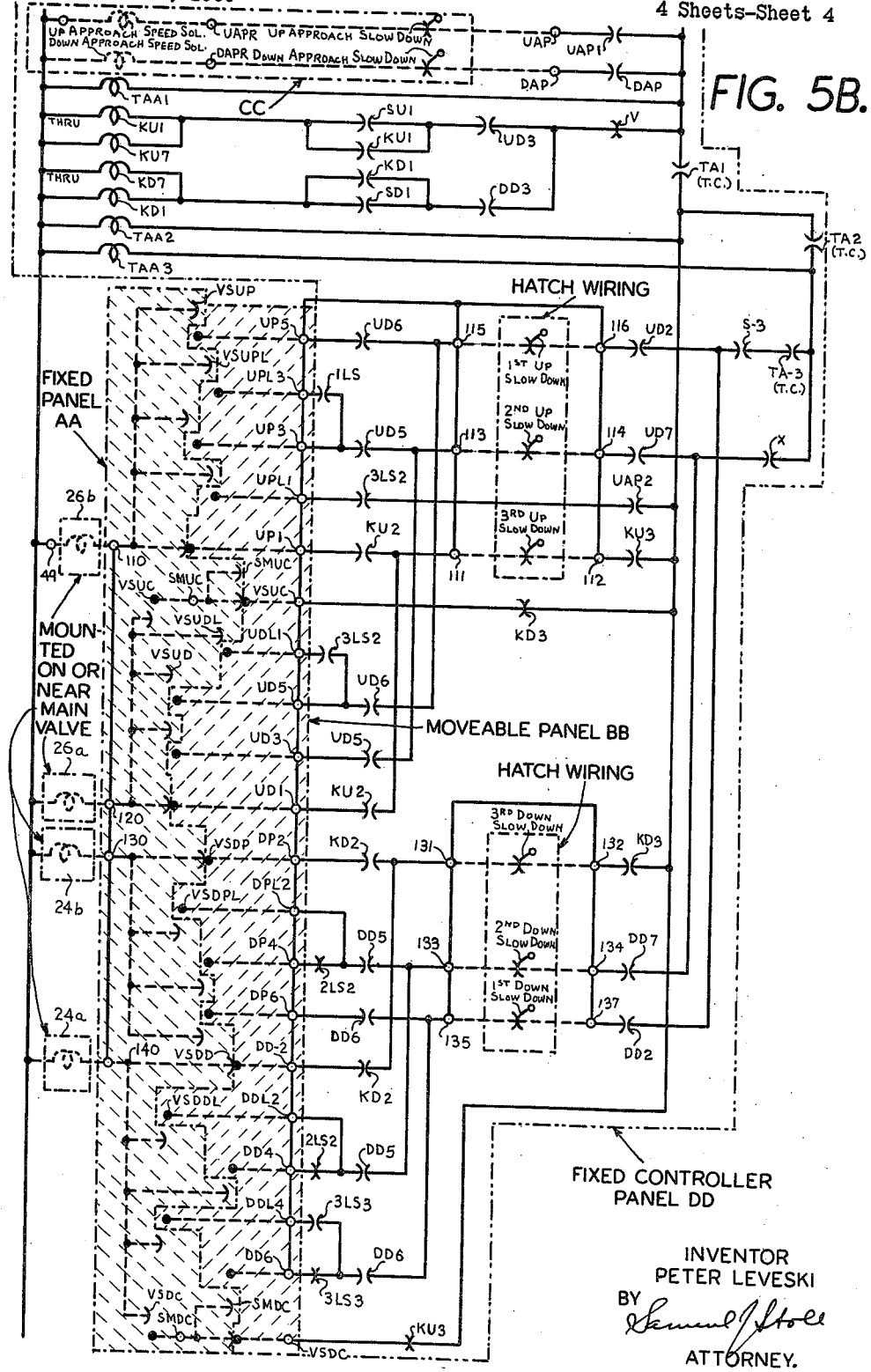
FIGURE 5B is a continuing portion of said circuit diagram.

Referring now particularly to FIGURES 2, 4A and 4B, it will be noted that a fixed panel A is connected to lines 110, 120, 130 and 140 and that movable panel B is positioned adjacent the fixed panel for movement relative thereto in a parallel plane. One method of causing such relative movement of panel B is illustrated in FIGURE 2. A cable C is connected at one end to linkage 50 and at the opposite end to the movable panel B and since said linkage and said movable panel are usually spaced from each other the cable is caused to run across suitable idler pulleys D and E. As has above been stated, linkage 50 is connected at one end to the main valve stem 40 and at the opposite end to the pilot valve stem 48. When the main valve stem 40 moves downwardly, linkage 50 acting through cable C causes the movable panel B to move upwardly. Conversely, when the main valve stem 40 moves upwardly, linkage 50 enables movable panel B to move downwardly under its own weight.

It will now be seen that fixed panel A is provided with a plurality of spaced parallel tracks 100 which extend across a horizontal centerline 102. Adjustably mounted in said tracks 100 are contact bars 140A and 120A, respectively, as well as contacts 140B, 140C, 140D, 140E and 140F. Also adjustably mounted in said tracks are contacts 130A, 130B, 130C and 130D. Similarly adjustably mounted in said tracks are contacts 120B, 120C, 120D and 120E. Also adjustably mounted in said tracks are contacts 110A, 110B, 110C, 110D and 110E. It will be noted in FIGURE 4A that the tracks are marked with certain descriptive notations to relate the contact members thereon to the valve mechanism shown in FIGURE 2. Thus, the first track is marked Valve Selector Down Centering Main Valve and on it is contact bar 140A. The second track is marked Valve Selector Up Centering Main Valve and adjustably mounted thereon is contact bar 120A. The third track is marked Valve Selector Down Direction Full Load and on it are adjustably mounted contacts 140B and 140C. The fourth track is marked Valve Selector Down Pilot Full Load and adjustably mounted thereon is contact member 130A. The fifth track is marked Valve Selector Down Pilot Normal Load and adjustably mounted thereon are contacts 130B, 130C and 130D. The sixth track is marked Valve Selector Down Direction Normal Load and adjustably mounted thereon are contacts 140D, 140E and 140F. The seventh track is marked Valve Selector Up Direction Normal Load and adjustably mounted thereon are contacts 120B, 120C and 120D. The eighth track is marked Valve Selector Up Pilot Normal Load and adjustably mounted on said track are contacts 110A, 110B and 110C. The ninth track is marked Valve Selector Up Pilot Full Load and adjustably mounted in said track are contacts 110D and 110E. The tenth track is marked Valve Selector Up Direction Full Load and adjustably mounted on said track is contact member 120E. It will be understood that contacts 110A–E are connected to conductor 110 in FIGURE 2 of the drawing. Contacts 120A–E are connected to conductor 120. Contacts 130A–D are connected to conductor 130 and contacts 140A–F are connected to conductor 140.

Turning now to FIGURE 4B, it will be observed that the movable panel B is similarly provided with spaced parallel vertical tracks 100A and with a horizontal centerline 102A. Adjustably mounted in the first track is a contact member SMDC signifying Signal Machine Down Centering Main Valve. Adjustably mounted in the second track is a contact member marked SMUC meaning Signal Machine Up Centering Main Valve. Adjustably mounted in the third track are contact members DDL2 and DDL4 which signify Down Direction Full Load. Adjustably mounted in the fourth track is contact member DPL2 which signifies Down Pilot Full Load. Adjustably mounted in the fifth track are three contact members DP2, DP4 and DP6, respectively, these designations signifying Down Pilot Normal Load. In the sixth track are adjustable contact members DD2, DD4 and DD6 which signify Down Direction Normal Load. In the seventh track are adjustable contact members UD5, UD3 and UD1 which signify Up Direction Normal Load. In the eighth track are adjustable contacts UP5, UP3 and UP1 which signify Up Pilot Normal Load. Adjustably mounted in the ninth track are contacts UPL3 and UPL1 which signify Up Pilot Full Load. In the tenth track is adjustable contact member UDL1 which signifies Up Direction Full Load.

The movable panel is slidably mounted relative to the fixed panel in such manner that the ten tracks on said movable panel register with the ten tracks on the fixed panel and the contact members on the movable panel are engageable with the contact members on the fixed panel. By way of illustration, contact members DD2, DD4 and DD6 in track six of the movable panel are engageable with contacts 140D, 140E and 140F in track six of the fixed panel. At what point the contact members on the movable panel engage the contact members on the fixed panel is a matter determined by the relative positions of the several contact members on each panel and the extent and direction of movement of said movable panel relative to said fixed panel.

L.S.A.D. CONTROL FOR WATER HYDRAULIC ELEVATORS FOR SPEEDS FROM 50 TO 1200 R.P.M.

*Down Direction—Load, Speed, Acceleration, Deceleration*

The down pilot and down direction valves operate similarly to the up pilot and direction valves. VSDP contact is closed on the load compensating control means or valve selector when the main valve is in neutral position and by closing KD2 and KD3, the pilot valve is energized.

VSDD is also closed on the valve selector to the down direction valve. When KD2 contact is closed the down pilot and down direction valves are simultaneously energized and the elevator car will start to travel in the down direction.

Assuming that the elevator car is fully loaded, the movable panel of the valve selector will start to travel with the operation of the main valve. At this point 2LS2 contact on a load switch will be opening the connection to the down pilot valve.

2LS2 load switch contact will also be open on the down direction valve.

3LS3 normally open contact would be closed and 3LS3 normally closed contact would be open with a full load.

The main valve would continue to open and the elevator speed would increase until the required speed is attained, at which point the valve selctor contact runs off bar DDL4. The main valve would open no further and the elevator would run at its required speed.

Assuming that the elevator does not have a full load, the valve would continue to open to the extent that travel on bar DD6 on the valve selector would permit and the elevator would maintain the required speed with no load because the discharge of water would be greater due to a larger opening of the valve. When arriving at a floor with a full load the elevator car will commence to decelerate and DD6 contact would open. The pilot valve and the direction valve would be de-energized and the main valve would begin returning to its neutral position. This would continue because 2LS2 on the pilot valve and 2LS2 on the down direction valve would be open. DD5 contact would open at a given point when the elevator would be in a predetermined position and the valve will continue to its neutral position. The final contact to open will be KD2 and the valve will then be in its neutral position. Contact points SMUC and SMDC are connected in series with KD3 normally closed contact. This arrangement is set up in the event that KD3 contacts are closed and the valve is not in a neutral position. Additional pressure or discharge is supplied to center the valve depending upon which direction the elevator is traveling.

L.S.A.D. CONTROL FOR WATER HYDRAULIC ELEVATORS FOR SPEEDS FROM 50 AND 1200 R.P.M.

Up Direction—Load, Speed, Acceleration, Deceleration

In the circuit diagram broken lines indicate hatch wiring and solid lines indicate wiring on the controller. The up approach speed solenoid valve is energized by UAP1 contact. The down approach speed solenoid valve is energized by DAP contact. The size of these valves is determined according to the overall speed and capacity of the elevator. TAA1 is energized and closes its own contact TA1 (TC). The TA1 contact is timed to close for whatever speed is required for proper acceleration for floor to floor operation. TAA2 timer is energized and its own TA2 contact is closed when the timer is energized. Upon closing of TA2 contact, TAA3 timer is energized and this closes TA3 timer contact. At this point the elevator controller is set to accelerate to higher speeds. Normally open X1 contact will remain open at all times, provided there is a call set above or below the elevator on approaching the next floor in direction of travel.

The water hydraulic valve will not exceed this point of travel and the speed of the elevator will be maintained to predetermined settings. At this point first up slow down, second up slow down, third up slow down, third down slow down, second down slow down, first down slow down, are so arranged that the speed of the elevator is controlled through the valve selector with or without a load. Up pilot contact on the valve selector is normally closed. Upon closing contacts KU2 and KU3 up pilot valve will energize at approximately the same time KU2 contact will close, thereby energizing up direction valve, causing the elevator to accelerate at greater speed. At this point the movable panel of the valve selector moves upwardly leaving UD1 contact and UP1 contact. These contacts are so arranged that UP3 will be made as UP1 is left holding the valve at that position and maintaining the required speed. UD3 also makes contact at this point.

Before the main valve could move and cause acceleration to greater speed UD5 contact has to be closed, UD7 has to be closed and x has to be closed. To accelerate to the final speed UD6, UD2, S2 and TA3 would have to be closed, this in turn would permit the valve to open to a given point and the elevator would run in full speed.

In the event that the elevator was fully loaded and the required speed was to be maintained in the up direction valve section 3LS2 would be energized. This is a predetermined load switch and the valve will open to a given point which would maintain the required speed. In connection with proper deceleration with given loads, it will be noticed that on up pilot 110 of this section is one LS switch which is a predetermined load switch. When this contact is closed and the valve is closing to its neutral position and VSULP, UPL3 and ILS make contact, the valve will stop at a given point and the elevator will maintain the required speed at that point. In connection with deceleration to a lower speed but still maintaining proper speed with a load at a given point in the elevator hatch, it will be noticed that 3LS2, which is a predetermined load switch, has been closed by a predetermined load setting. UPL1 has made contact on the valve selector. UAP2 has been closed and will remain so until the approach speed of the elevator is passed. By closing the 3LS2 contact with a load and maintaining the pilot valve 110 in a preset position, the elevator will maintain the required approach speed with a load as originally preset without a load.

I claim:

1. In a hydraulic elevator system wherein an elevator cab is driven by a hydraulic ram, apparatus for controlling the operation of said hydraulic ram, including a hydraulic control valve and control means, including a pilot valve operating and controlling said hydraulic control valve through a linkage between the respective valve stems of said hydraulic control valve and said pilot valve, said hydraulic control valve having a port communicating with a fluid pressure source, a second port communicating with the hydraulic ram and a third port communicating with a fluid sink, the valve stem of said hydraulic control valve being movable in one direction to close off the fluid sink and to provide communication between the fluid pressure source and the hydraulic ram for upward movement of the elevator cab and being movable in the opposite direction to close off the fluid pressure source and to provide communication between the hydraulic ram and the fluid sink for downward movement of the elevator cab, and auxiliary hydraulic control valve means connected to said linkage to compensate for load variations and thereby to regulate the speed of the elevator cab as desired, regardless of its load, said auxiliary hydraulic control valve means comprising a fixed panel and a panel movable relative to said fixed panel, said movable panel being connected to said linkage for movement therewith, each of said panels being provided with a plurality of control switch elements which are adjustably mounted thereon, the switch control elements of the movable panel being selectively engageable with the switch control elements of the fixed panel, the extent of movement of said movable panel relative to said fixed panel determining which of the control elements of the fixed panel will be engaged by the switch control elements of the movable panel, said switch control elements of the fixed panel being in circuit with solenoid control means connected to the pilot valve, whereby said pilot valve is operated and controlled to control operation of the hydraulic control valve.

2. In a hydraulic elevator system in accordance with claim 1, wherein said pilot valve is mechanically connected to said hydraulic control valve to actuate the piston and valve stem of said hydraulic control valve, said pilot valve being connected by hydraulic lines to the fluid chamber of said hydraulic control valve and also to the fluid pressure source and fluid sink, solenoid controlled valves being connected to said hydraulic lines to control the flow therethrough, said solenoid controlled valves being in circuit with control switch elements on the fixed panel and being energized when contact is made between said last-mentioned control switch elements and corresponding control switch elements on the movable panel.

3. In a hydraulic elevator system in accordance with claim 2, wherein a normally open solenoid controlled valve is connected to the hydraulic line between the pressure fluid source and the pilot valve and a normally open solenoid controlled valve is connected to the hydraulic line between the pilot valve and the fluid sink, a normally closed solenoid controlled valve being disposed in a hydraulic line between the pressure fluid source and the fluid chamber of the hydraulic control valve and a normally closed solenoid controlled valve is connected to a hydraulic line between the fluid sink and the fluid chamber of said hydraulic control valve.

4. In a hydraulic elevator system in accordance with claim 1, wherein the linkage between the valve stems of the hydraulic control valve and the pilot valve comprises a pivoted lever connected at one end to the valve stem of the hydraulic control valve and connected at the opposite end to the valve stem of the pilot valve, a cable and pulley connection being provided between said lever and said movable panel and comprising a cable connected at one end to one end of said lever, said cable being connected at its opposite end to said movable panel, and a plurality of pulleys supporting said cable intermediate its ends, whereby pivotal movement of said lever in one direction causes the movable panel to move downwardly relative to said fixed panel and whereby pivotal movement of said lever in the opposite direction causes the movable panel to move upwardly relative to said fixed panel.

5. In a hydraulic elevator system in accordance with claim 1, wherein the fixed panel is provided with a plurality of vertically extending parallel tracks in which a plurality of control switch elements are adjustably mounted, said control switch elements being adjustable in either vertical direction above and below a central horizontal line extending across said fixed panel, said movable panel being provided with a like number of vertically extending parallel tracks spaced from each other in accordance with the spacing of the tracks on the fixed panel, a plurality of control switch elements being adjustably mounted in said tracks of the movable panel above and below a central horizontal line extending across said movable panel, whereby the control switch elements mounted in any one track of the movable panel are engageable with the control switch elements mounted in the corresponding track of the fixed panel, the relative time of contact being determined by the relative spacing of said control switch elements on both panels and the extent of vertical movement of said movable panel relative to the fixed panel.

No references cited.